United States Patent
Kim

(10) Patent No.: US 6,731,941 B2
(45) Date of Patent: May 4, 2004

(54) METHOD FOR LOCATING MOBILE STATION BASED ON POWER-RELATED MESSAGE OF BASE TRANSCEIVER STATION

(75) Inventor: Sang-Seong Kim, Ichon-shi (KR)

(73) Assignee: Huyndai Electronics Industries Co., Inc. (KR)

( * ) Notice: Subject to any disclaimer, the term of this patent is extended or adjusted under 35 U.S.C. 154(b) by 512 days.

(21) Appl. No.: 09/821,356

(22) Filed: Mar. 29, 2001

(65) Prior Publication Data

US 2001/0027114 A1 Oct. 4, 2001

(30) Foreign Application Priority Data

Mar. 30, 2000 (KR) ........................................ 2000-16639

(51) Int. Cl.[7] ................................................ H04Q 7/20
(52) U.S. Cl. .................... 455/456.2; 455/513; 455/522; 455/524; 370/342
(58) Field of Search ........................... 455/422.1, 432.1, 455/435.1, 456.1, 456.2, 456.3, 456.4, 456.5, 456.6, 513, 522, 524, 525, 68, 69, 134, 139, 450, 509, 464, 575, 436, 440; 370/318, 319, 320, 328, 330, 332, 335, 338, 342, 346

(56) References Cited

U.S. PATENT DOCUMENTS

| | | | |
|---|---|---|---|
| 6,006,096 A | * 12/1999 | Trompower | 455/456.2 |
| 6,009,091 A | * 12/1999 | Stewart et al. | 370/342 |
| 6,011,974 A | 1/2000 | Cedervall et al. | 455/456 |
| 6,021,330 A | 2/2000 | Vannucci | 455/456 |
| 6,035,202 A | 3/2000 | Camp, Jr. | 455/456 |
| 6,275,186 B1 | * 8/2001 | Kong | 342/363 |

\* cited by examiner

*Primary Examiner*—Nay Maung
*Assistant Examiner*—Tanmay Lele
(74) *Attorney, Agent, or Firm*—Baker Botts LLP

(57) ABSTRACT

A method for locating a mobile station (MS) based on a power-related message of base transceiver stations (BTS) in a mobile communication system includes the steps of: by a call control processor (CCP) of a base station controller (BSC), checking an active set that the mobile station currently holds; by the call control processor, determining if the active set is covered over three base transceiver stations; if the active set is not covered over the three base transceiver stations, by frequency allocation of the active set, reading out status information of neighboring base transceiver stations; by the call control processor, determining if the frequency allocation of the active set is usable; if the frequency allocation is usable, transmitting to the mobile station a PSMRO (pilot strength message request order) that is a message for requesting to measure pilot strength of the frequency allocation; arranging a plurality of base transceiver stations in order of pilot strength based on the pilot strength measurement result and selecting 3 base transceiver stations having higher pilot strength; and directing the selected 3 base transceiver stations to be prepared to receive a PUF (PUF=power up function) pulse.

7 Claims, 5 Drawing Sheets

US 6,731,941 B2

METHOD FOR LOCATING MOBILE STATION BASED ON POWER-RELATED MESSAGE OF BASE TRANSCEIVER STATION

FIELD OF THE INVENTION

This invention relates to a method for locating a mobile station in a mobile communication system; and more particularly, to a method for locating a mobile station based on a message supported by IS-95B standard in a CDMA mobile communication system or a PCS mobile communication system.

DESCRIPTION OF THE PRIOR ART

A representative one of conventional methods for locating a mobile station (MS) in a mobile communication system is to locate the MS based on a location registration message. The location registration message includes cell information, sector information or the like.

However, in case of locating the MS using the location registration message, there are a couple of following problems. It is possible to locate the MS approximately based on the cell information or the sector information but difficult to locate the MS exactly due to a difference between a computed distance and a measured distance to the MS. Also, it is not possible to locate the MS in real-time because the MS transmits the location registration message on a couple of predetermined conditions. For example, the MS transmits the location registration message by periods, at power-on, at power-off or the like.

SUMMARY OF THE INVENTION

It is an object of the present invention to provide a method for locating a mobile station (MS) based on a power-related message of base transceiver stations (BTS) in a mobile communication system to thereby locate the mobile station more exactly.

In accordance with an aspect of the present invention, there is provided a method for locating a mobile station (MS) based on a power-related message of base transceiver stations (BTS) in a mobile communication system, including the steps of: by a call control processor (CCP) of a base station controller (BSC), checking an active set that the mobile station currently holds; by the call control processor, determining if the active set is covered over three base transceiver stations; if the active set is not covered over the three base transceiver stations, by frequency allocation of the active set, reading out status information of neighboring base transceiver stations; by the call control processor, determining if the frequency allocation of the active set is usable; if the frequency allocation is usable, transmitting to the mobile station a PSMRO (pilot strength message request order) message for requesting to measure pilot strength of the frequency allocation; arranging a plurality of base transceiver stations in order of pilot strength based on the pilot strength measurement result and selecting 3 base transceiver stations having higher pilot strength; and directing the selected 3 base transceiver stations to be prepared to receive a PUF (power up function) pulse.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
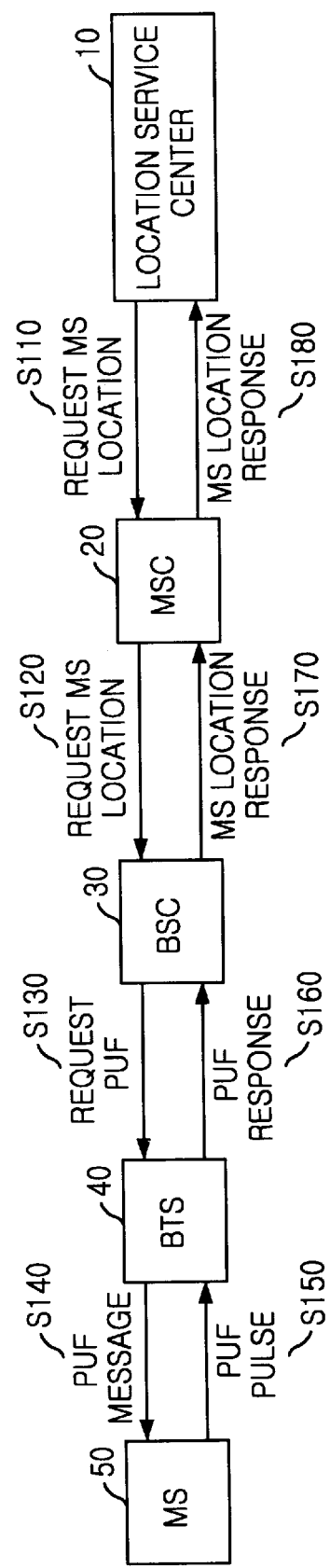
FIG. 1 is a block diagram illustrating a method for locating a mobile station in a mobile communication system in accordance with the present invention.

FIG. 1 is a block diagram illustrating a method for locating a mobile station in a mobile communication system in accordance with the present invention.

As shown in FIG. 1, a mobile communication system includes a location service center (LSC) 10, a mobile switching center (MSC) 20, a base station controller (BSC) 30, a base transceiver station (BTS) 40 and a mobile station (MS) 50.

At the step S110, the LSC 10 requests the MSC 20 of MS location information and in response to the request of the LSC 10, at the step S120, the MSC 20 requests the BSC 30 of the MS location information.

At the step S130, the BSC 30 directs the BTS 40 to be prepared for receive a power up function pulse (PUF pulse).

In response to the direction of the BSC 30, at the step S140, the BTS 40 transmits a PUF message to the MS 50. The PUF message refers to a message that the MS 50 is to transmit a PUF pulse to the BTS 40.

At the step S150, the MS 50 transmits the PUF pulse to the BTS 40 at a predetermined strength.

At the step S160, the BTS 40 receives and senses the transmitted PUF pulse and reports information about a round trip delay and strength of a pilot signal or the like to the BSC 30 based on the PUF pulse.

At the step S170, the BSC 30 reports the same to the MSC 20.

At the step S180, the MSC 20 reports the same to the LSC 10.

Figure 2A:
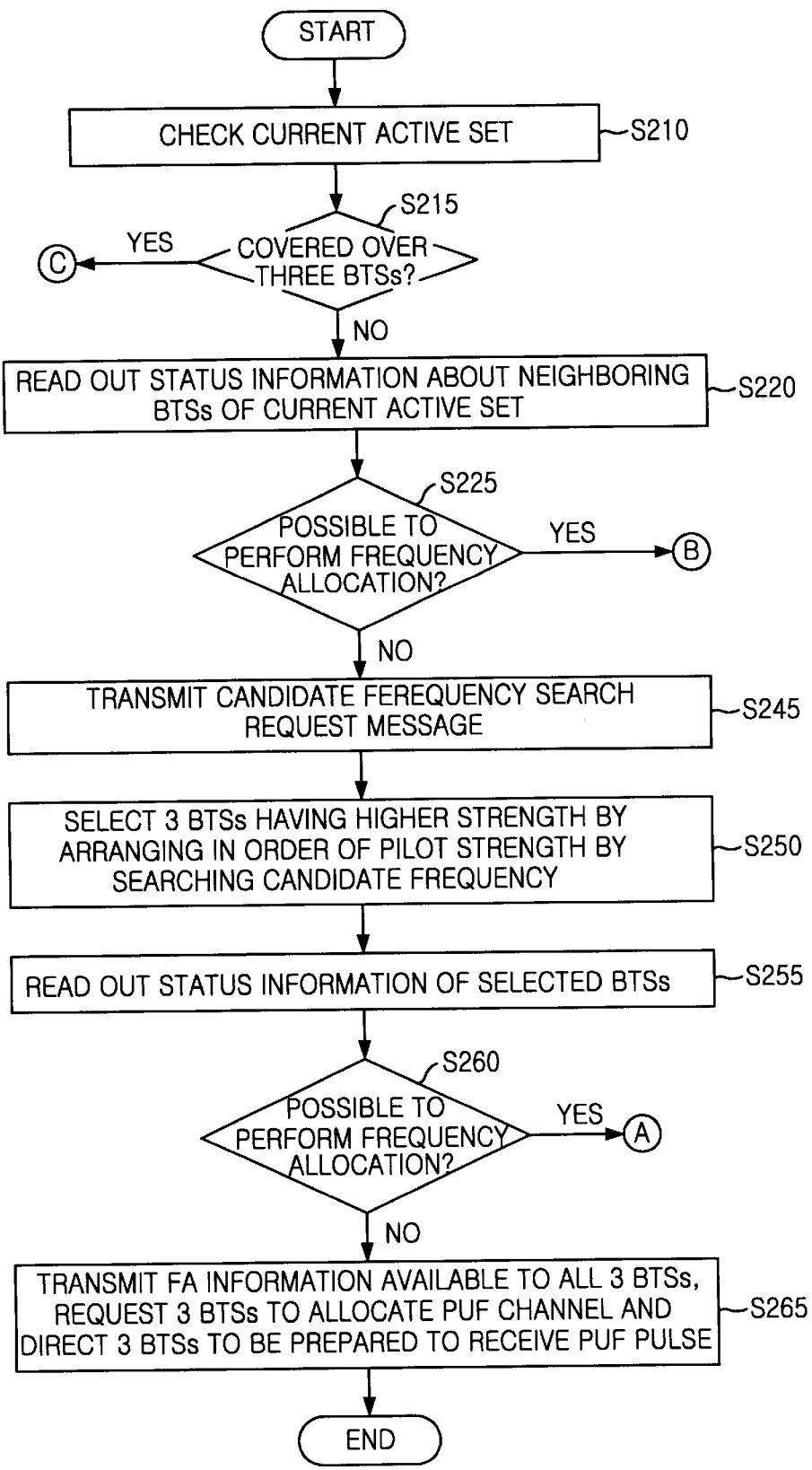
FIGS. 2A and 2B are flow charts illustrating a method for selecting three base transceiver station that are to receive a power up function (PUF) pulse from a mobile station in accordance with the present invention.
Figure 2B:
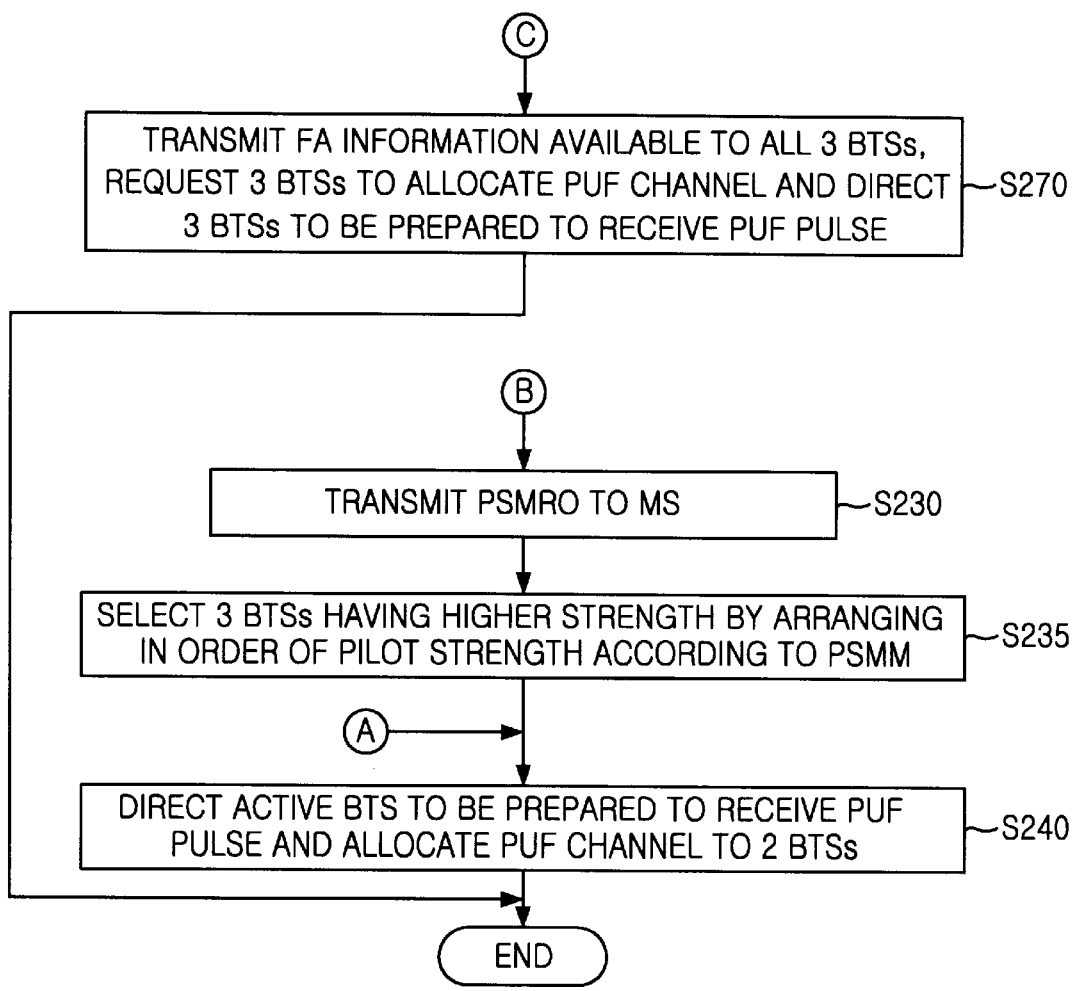

FIG. 2 is a flow chart illustrating a method for selecting three base transceiver station that are to receive a power up function (PUF) pulse from a mobile station in accordance with the present invention.

When receiving a location information request, at the step S210, a call control processor (CCP) of a base station controller (BSC) checks a current active set.

At the step S215, the CCP determines if the current active set is covered by 3 base transceiver stations (BTS) and if not, the logic flow proceeds to step S220, otherwise proceeds to step S270 where the CCP transmits FA information about a FA usable in all 3 BTSS to the 3 BTSs, requests the 3 BTSs to allocate a PUF channel and directs to be prepared to receive the PUF pulse.

At the step S220, file allocation (FA) of the current active set reads out status information of a neighboring BTS.

At the step S225, the CCP determines if the FA of the current active set is activated in the neighboring BTS, and if not, the logic flow proceeds to step S245, otherwise proceeds to step S230.

At the step S230, the CCP transmits to a mobile station (MS) a pilot strength measurement request order (PSMRO) that the MS should report a pseudo noise (PN) and strength of a pilot channel that the MS currently receives.

At the step S235, the mobile station performs arranging a plurality of BTSs in order of pilot strength, based on a pilot strength measurement message (PSMM) and selecting 3 BTSs having higher pilot strength.

At the step S240, the CCP directs an activated BTS to be prepared to receive the power up function (PUF) pulse and directs the 2 remaining inactivated BTSs to be prepared to receive the PUF pulse from the MS after allocating a new PUF channel to the 2 remaining inactivated BTSs.

At the step S245, the MS searches a FA that is usable in all of 3 BTSs and transmits a candidate frequency search request message.

At the step S250, the MS performs arranging a plurality of BTSs in order of pilot strength based on a search result and selecting 3 BTSs having higher pilot strength.

At the step S255, status information of the selected BTSs is read out.

At the step S260, it is determined if the current FA is usable in all of 3 selected BTSs, and if not, the logic flow proceeds to the step S265, otherwise proceeds to the step S240.

At the step S265, the CCP transmits FA information about a FA usable in all the selected 3 BTSS to the selected 3 BTSs, requests the selected 3 BTSs to allocate the PUF channel and directs to be prepared to receive the PUF pulse.

Figure 3:
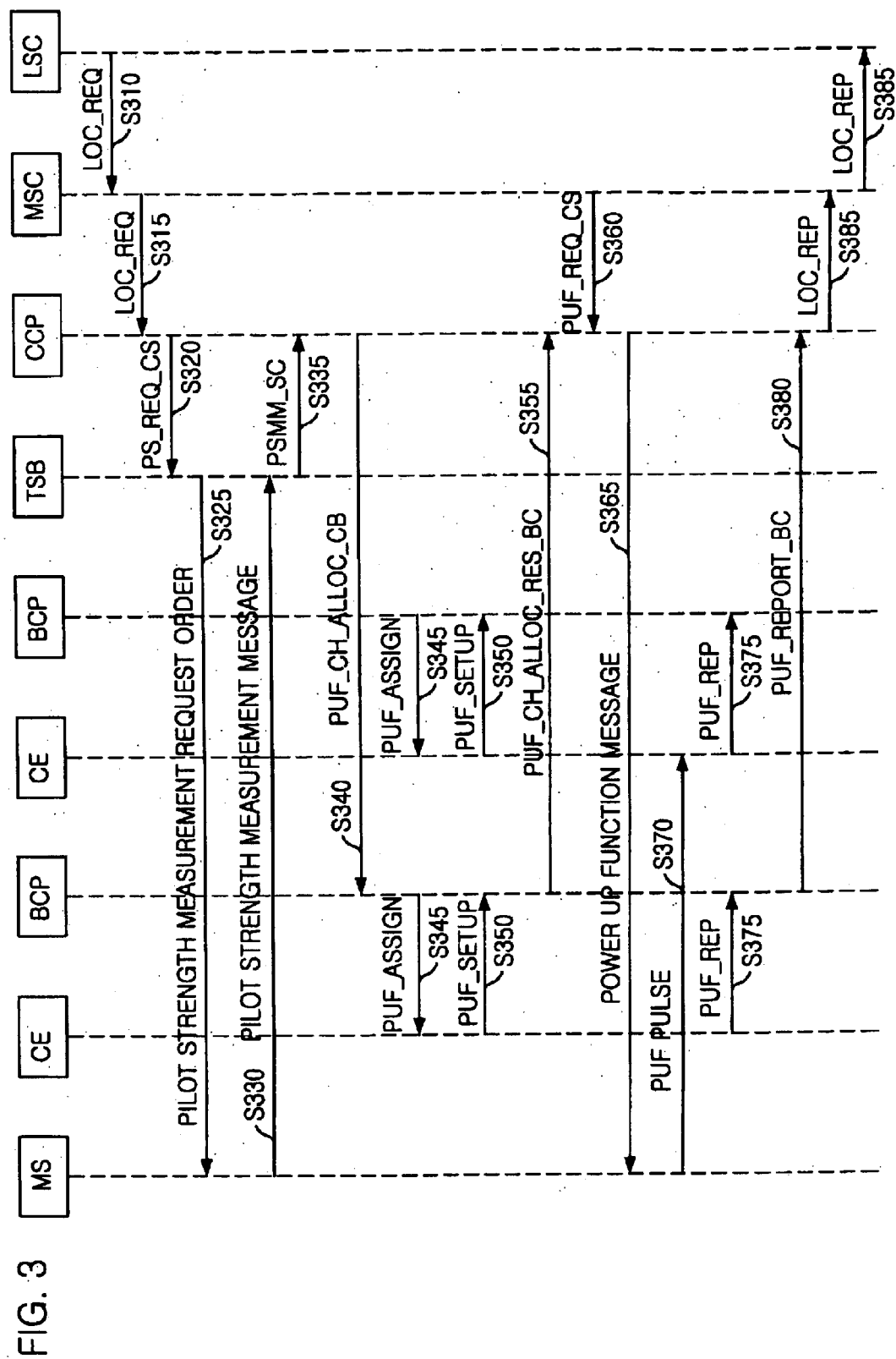
FIG. 3 is a flowchart illustrating a method for a call processing in performing a PUF based on a current frequency assignment (FA) in accordance with the present invention.

FIG. 3 is a flowchart illustrating a method for a call processing in performing a PUF based on a current frequency allocation (FA) in accordance with the present invention.

Referring to FIG. 3, at the step S310, a location service center (LSC) transmits to a mobile switching center (MSC) a LOC_REQ message requesting location information of a mobile station (MS).

At the step S315, the MSC transmits the same message to a call control processor (CCP) and the CCP determines if a current active set is covered over 3 base transceiver stations (BTS), and if the current active set is covered over the 3 BTSs, steps S320 to S335 are disregarded.

If the current active set is not covered over the 3 BTSs and frequency allocation (FA) of the current set is usable in all neighboring BTSs, at the step S320, the CCP transmit to a transcoder selector bank (TSB) a PS_REQ_CS message requesting to measure a pilot strength that the MS currently receives.

AT the step S325, the TSB transmits to the MS a PSMRO (pilot strength measurement request order) that is a message requesting to measure the pilot strength.

At the step S330, the MS transmits to the TSB a PSMM (pilot strength measurement message) that is a message including a pilot strength measurement result.

At the step S335, the TSB transmits to the CCP a PSMM_SC message including the pilot strength measurement result.

At the step S340, the CCP transmits a PUF_CH_ALLOC_CB message to one or more BCPs. According to the PUF_CH_ALLOC_CB message, the CCP performs arranging a plurality of BTSs in order of pilot strength based on the pilot strength measurement result and selecting 3 BTSs having higher pilot strength, requests a currently active BTS that a channel element already allocated thereto is prepared to receive a power up function (PUF) pulse and allocates a new PUF channel to an inactive neighboring BTS.

At the step S345, the BCP transmits a PUF_ASSIGN message to one or more channel elements (CE). According to the PUF_ASSIGN message, the new PUF channel element is allocated to the BTS or the BCP directs the existing CE to be prepared to receive the PUF pulse.

At the step S350, the CE transmits to the BCP a PUF_SETUP message informing that the CE is ready to receive the PUF pulse.

At the step S355, the BCP transmits to the CCP a PUF_CH_ALLOC_RES_BC message informing that the channel allocation and the preparation for receiving the PUF pulse are completed.

At the step S360, the CCP transmits to the TSB a PUF_REQ_CS message requesting to transmitting a PUF message to the MS.

At the step S365, the TSB transmits the PUF message to the MS.

At the step S370, the MS performs a PUF attempt using a predetermined parameter.

At the step S375, channel elements (CE) of each of 3 BTSs that received the PUF pulse transmits a PUF_REP message to the BCP, wherein the PUF_REP message includes a RTD value (round trip delay) value, received power, a time stamp at reception time or the like.

At the step S380, the BCP transmits a PUF_REPORT_BC message to the CCP, wherein the PUF_REPORT_BC message includes the same information as that of the PUF_REP message.

At the step S385, the CCP transmits a LOC_REP message to the MSC, wherein the LOC_REP message includes the same information as that of the PUF_REP message.

At the step S390, the MSC transmits to the LSC the LOC_REP message including location information.

Figure 4:
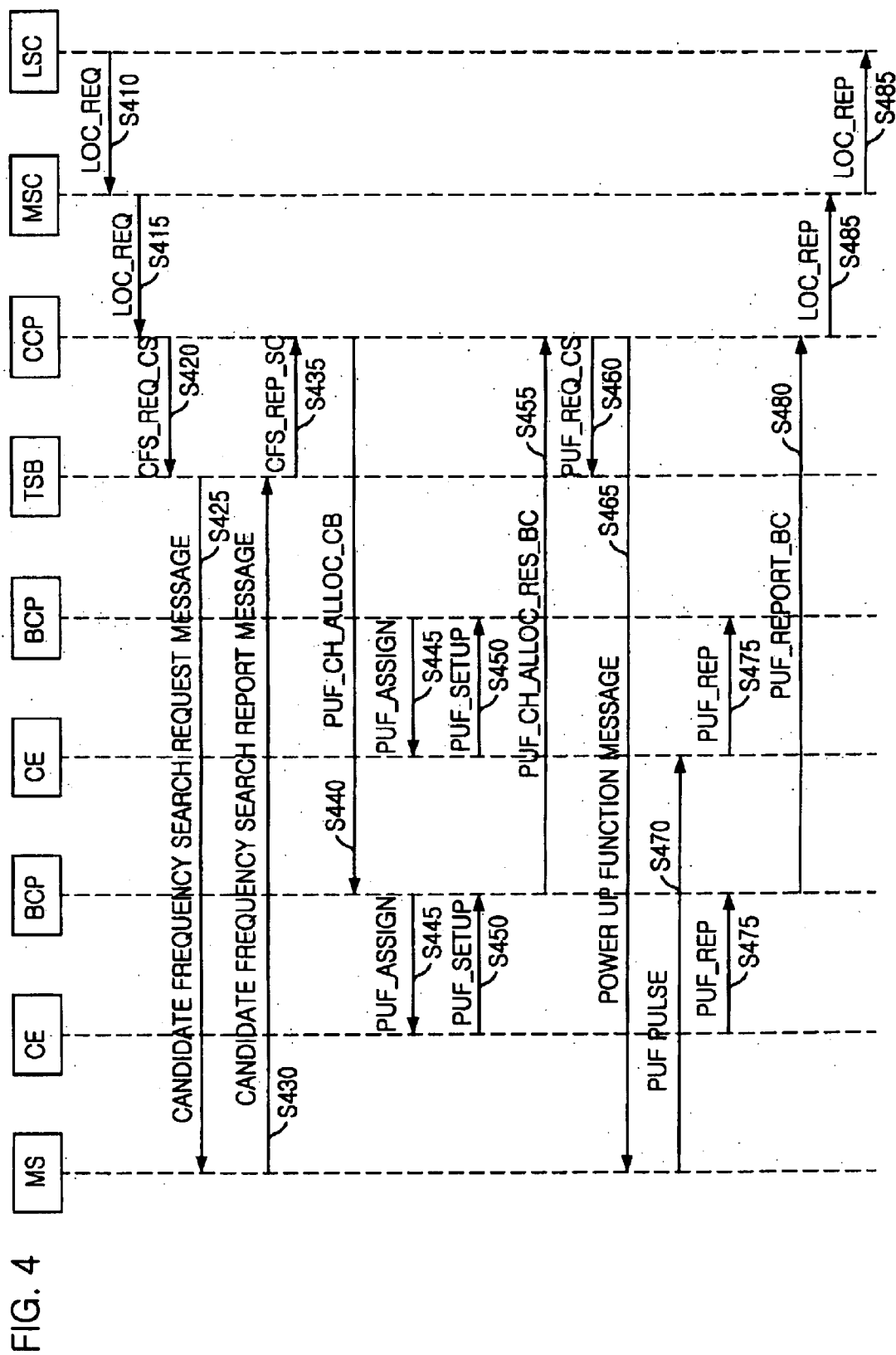
FIG. 4 is a flowchart illustrating a method for call processing in performing a PUF based on other frequency assignment (FA) in accordance with the present invention.

FIG. 4 is a flowchart illustrating a method for call processing in performing a PUF based on other frequency assignment (FA) in accordance with the present invention. That is to say, FIG. 4 illustrates a method for call processing in performing a PUF in case a BTS participating to locate the MS cannot be operated with a current FA.

Referring to FIG. 4, at the step S410, a location service center (LSC) transmits to a mobile switching center (MSC) a LOC_REQ message requesting location information of a mobile station (MS).

At the step S415, the MSC transmits the same message to a call control processor (CCP) and the CCP determines if a current active set is covered over 3 base transceiver stations (BTS), and if the current active set is covered over the 3 BTSs, steps S420 to S435 are disregarded.

If the current active set is not covered over the 3 BTSs and frequency allocation (FA) of the current set is not usable in all neighboring BTSs, at the step S420, the CCP transmit to a transcoder selector bank (TSB) a CFS_REQ_CS message requesting to search a candidate frequency after selecting usable frequency allocation.

AT the step S425, the TSB transmits to the MS a candidate frequency search request message requesting to search the candidate frequency.

At the step S430, the MS transmits to the TSB a candidate frequency search report message including a frequency search result.

At the step S435, the TSB transmits to the CCP a CFS_REP_SC message including the frequency search result.

At the step S440, the CCP transmits a PUF_CH_ALLOC_CB message to one or more BCPs. According to the PUF_CH_ALLOC_CB message, the CCP performs arranging a plurality of BTSs in order of pilot strength based on the pilot strength measurement result and selecting 3 BTSs having higher pilot strength, determines if the FA of the current active set is usable in all the selected 3 BTSs, and if not, allocates a new PUF channel to all the selected 3 BTSs and directs the 3 BTSs to be prepared to receive the PUF pulse.

At the step S445, the BCP transmits a PUF_ASSIGN message to one or more CEs (channel element). According to the PUF_ASSIGN message, the new PUF channel element is allocated to the new FA or the BCP directs the new channel element to be prepared to receive the PUF pulse.

At the step S450, the CE transmits to the BCP a PUF_SETUP message informing that the CE is ready to receive the PUF pulse.

At the step S455, the BCP transmits to the CCP a PUF_CH_ALLOC_RES_BC message informing that the channel allocation and the preparation for receiving the PUF pulse are completed.

At the step S460, the CCP transmits to the TSB a PUF_REQ_CS message requesting to transmitting a PUF message to the MS.

At the step S465, the TSB transmits the PUF message to the MS.

At the step S470, the MS performs a PUF attempt using a predetermined parameter.

At the step S475, channel elements (CE) of each of 3 BTSs that received the PUF pulse transmits a PUF_REP message to the BCP, wherein the PUF_REP message includes a RTD value (round trip delay) value, received power, a time stamp at reception time or the like.

At the step S480, the BCP transmits a PUF_REPORT_BC message to the CCP, wherein the PUF_REPORT_BC message includes the same information as that of the PUF_PREP message.

At the step S485, the CCP transmits a LOC_REP message to the MSC, wherein the LOC_REP message includes the same information as that of the PUF_REP message.

At the step S490, the MSC transmits to the LSC the LOC_REP message including location information.

Although the preferred embodiments of the invention have been disclosed for illustrative purpose, those skilled in the art will appreciate that various modifications, additions, and substitutions are possible, without departing from the scope and spirit of the invention as disclosed in the accompanying claims.

What is claimed is:

1. A method for locating a mobile station (MS) based on a power-related message of base transceiver stations (BTS) in a mobile communication system, comprising the steps of:
   a) by a call control processor (CCP) of a base station controller (BSC), checking an active set that the mobile station currently holds;
   b) by the call control processor, determining if the active set is covered over three base transceiver stations;
   c) if the active set is not covered over the three base transceiver stations, by frequency allocation of the active set, reading out status information of neighboring base transceiver stations;
   d) by the call control processor, determining if the frequency allocation of the active set is usable;
   e) if the frequency allocation is usable, transmitting to the mobile station a PSMRO (pilot strength message request order) that is a message for requesting to measure pilot strength of the frequency allocation;
   f) arranging a plurality of base transceiver stations in order of pilot strength based on a pilot strength measurement result and selecting 3 base transceiver stations having higher pilot strength; and
   g) directing the selected 3 base transceiver stations to be prepared to receive a PUF (PUF=power up function) pulse.

2. The method as recited in claim 1, wherein the step c) further includes the step of:
   h) if the active set is covered over the three base transceiver stations, directing the 3 base transceiver stations to be prepared to receive the PUF pulse and transmitting to the mobile station a PUF message for requesting to transmit the PUF pulse.

3. The method as recited in claim 1, wherein the step g) further includes the step of:
   i) allocating a new PUF channel to 2 inactive base transceiver stations and directing the 2 inactive base transceiver stations to be prepared to receive the PUF pulse.

4. The method as recited in claim 1, wherein at the step e), the call control processor further transmits to the mobile station frequency allocation of the current active set and a pseudo noise.

5. The method as recited in claim 1, wherein the step e) further includes the step of:
   j) if the frequency allocation is not usable, transmitting to the mobile station a search request message that the mobile station needs to search candidate frequency allocation usable in all neighboring base transceiver stations.

6. The method as recited in claim 5, wherein the step j) includes the step of:
   j1) arranging a plurality of base transceiver stations in order of pilot strength based on the candidate frequency search result and selecting 3 base transceiver stations having higher pilot strength;
   j2) reading out status information of the 3 base transceiver stations selected at the step j1);
   j3) determining if the current frequency allocation is active and usable in all of the selected 3 base transceiver stations;
   j4) if the current frequency allocation is usable, directing an active base transceiver station to be prepared to receive the PUF pulse, allocating a first new PUF channel to 2 inactive base transceiver stations and transmitting to the mobile station a PUF message for requesting the PUF pulse.

7. The method as recited in claim 6, wherein the step j4) further includes the step of:
   j5) if the current frequency allocation is not usable, allocating a second new PUF channel usable in all the selected 3 base transceiver stations to the selected 3 base transceiver stations and directing the 3 base transceiver stations to be prepared to receive the PUF pulse.

* * * * *